United States Patent
Hu et al.

(10) Patent No.: US 9,941,781 B2
(45) Date of Patent: Apr. 10, 2018

(54) MULTI-RAIL SWITCHING CONVERTER, CONTROL CIRCUIT AND ASSOCIATED CONTROL METHOD

(71) Applicant: Chengdu Monolithic Power Systems Co., Ltd., Chengdu (CN)

(72) Inventors: Wangmiao Hu, Hangzhou (CN); Lijie Jiang, Hangzhou (CN); Wenbin Lu, Hangzhou (CN); Qian Ouyang, Hangzhou (CN); Jinghai Zhou, San Jose, CA (US); Eric Yang, Saratoga, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 292 days.

(21) Appl. No.: 14/970,457

(22) Filed: Dec. 15, 2015

(65) Prior Publication Data
US 2016/0172959 A1    Jun. 16, 2016

(30) Foreign Application Priority Data

Dec. 15, 2014    (CN) .......................... 2014 1 0775609

(51) Int. Cl.
H02J 3/14    (2006.01)
H02M 1/084    (2006.01)
H02M 3/156    (2006.01)
H02M 1/00    (2006.01)

(52) U.S. Cl.
CPC ........... *H02M 1/084* (2013.01); *H02M 3/156* (2013.01); *H02M 2001/008* (2013.01)

(58) Field of Classification Search
CPC . H02M 1/084; H02M 3/156; H02M 2001/008
USPC ......................................................... 307/31
See application file for complete search history.

(56) References Cited

U.S. PATENT DOCUMENTS

| | | | |
|---|---|---|---|
| 8,896,278 B2 | 11/2014 | Ouyang et al. | |
| 9,071,142 B2 | 6/2015 | Yang et al. | |
| 9,081,397 B2 | 7/2015 | Jiang et al. | |
| 2014/0022684 A1 | 1/2014 | Jiang et al. | |
| 2014/0167833 A1 | 6/2014 | Jiang et al. | |
| 2015/0002126 A1 | 1/2015 | Ouyang | |

*Primary Examiner* — Richard Tan
(74) *Attorney, Agent, or Firm* — Perkins Coie LLP (57) ABSTRACT

A multi-rail switching converter providing a plurality of output voltages has a master switching circuit, a plurality of slave switching circuits and a control circuit. The control circuit has an interleaving control circuit, the interleaving control circuit judges a phase zone of a corresponding slave switching circuit based on a switching control signal of the master switching circuit and a set signal of the corresponding slave switching circuit, and adjusts a turn-ON moment of the corresponding slave switching circuit based on the phase zone of the corresponding slave switching circuit.

20 Claims, 9 Drawing Sheets

MULTI-RAIL SWITCHING CONVERTER, CONTROL CIRCUIT AND ASSOCIATED CONTROL METHOD

CROSS-REFERENCE TO RELATED APPLICATION

This application claims the benefit of CN application No. 2014/10775609.6, filed on Dec. 15, 2014, and incorporated herein by reference.

TECHNICAL FIELD

The present invention relates to electrical circuit, more particularly but not exclusively relates to switching converter.

BACKGROUND

With development of electronic technology, multi-rail switching converter having a plurality of switching circuits to provide a plurality of output voltages is widely used as power supply for many electronic devices. Constant ON time (COT) control is employed to control switching converter for fast transient response, simple circuit structure, and smooth mode transition. However, it is not easy to achieve phase interleaving for COT controlled multi-rail switching converter, since each rail switching circuit has different output voltage, different ON-time period, and different switching frequency. Factors making non-average distribution of phase-shift among each rail switching circuit are, for example, different load condition and different parasitic parameters, and as a result, input ripple of multi-rail switching converter increases and (Electromagnetic Compatibility) EMC performance becomes worse.

Thereby, a multi-rail switching converter having average phase-shift among each rail switching circuit is needed, even when each rail switching circuit has different circuit parameters.

SUMMARY

It is one of the objects of the present invention to provide multi-rail switching converter, control circuit and associated control method.

One embodiment of the present invention discloses a multi-rail switching converter, having an input port and a plurality of output ports configured to provide a plurality of output voltages, the multi-rail switching converter comprising: a plurality of switching circuits, each of the plurality of switching circuits having an input terminal coupled to the input port, and an output terminal coupled to one of the plurality of output ports, wherein one of the plurality of switching circuits is configured as a master switching circuit, and other of the plurality of switching circuits are configured as slave switching circuits; a plurality of comparison circuits, configured to provide a plurality of set signals based on the plurality of output voltages and a plurality of reference signals; a plurality of switching control circuits, configured to provide a plurality of switching control signals based on the plurality of set signals and a plurality of ON-time period control signals to control the plurality of switching circuits; and an interleaving control circuit, configured to judge a phase zone of a corresponding slave switching circuit based on a switching control signal of the master switching circuit and a set signal of the corresponding slave switching circuit, and configured to adjust a turn-ON moment of the corresponding slave switching circuit based on the phase zone of the corresponding slave switching circuit; wherein when the corresponding slave switching circuit is judged as in a leading phase zone, the turn-ON moment of the corresponding slave switching circuit is postponed by postponing the set signal of the corresponding slave switching circuit a set-delay time period; and wherein when the corresponding slave switching circuit is judged as in a lagging phase zone, the turn-ON moment of the corresponding slave switching circuit is brought forward by calibrating a reference signal of the corresponding slave switching circuit.

Another embodiment of the present invention discloses a control method for a multi-rail switching converter, the multi-rail switching converter having a plurality of switching circuits to provide a plurality of output voltages, and one of the switching circuits is configured as a master switching circuit, and other of the plurality of switching circuits are configured as slave switching circuits, the control method comprising: providing a plurality of set signals based on the plurality of output voltages and a plurality of reference signals; providing a plurality of ON-time period control signals to control ON-time periods of the plurality of switching circuits; providing a plurality of switching control signals based on the plurality of set signals and the plurality of ON-time period control signals to control the plurality of switching circuits; and judging a phase zone of a corresponding slave switching circuit based on a switching control signal of the master switching circuit and a set signal of the corresponding slave switching circuit; wherein when the corresponding slave switching circuit is judged as in a leading phase zone, postponing a turn-ON moment of the corresponding slave switching circuit by postponing the set signal of the corresponding slave switching circuit a set-delay time period; and wherein when the corresponding slave switching circuit is judged as in a lagging phase zone, providing a reference calibration signal to bring forward the turn-ON moment of the corresponding slave switching circuit by calibrating a reference signal of the corresponding slave switching circuit.

Yet another embodiment of the present invention discloses a control circuit for a multi-rail switching converter, the multi-rail switching converter having a master switching circuit configured to provide a first output voltage and a slave switching circuit configured to provide a second output voltage, the control circuit comprising: a first comparison circuit, configured to provide a first set signal based on the first output voltage and a first reference signal; a second comparison circuit, configured to provide a second set signal based on the second output voltage and a second reference signal; a first switching control circuit, configured to provide a first switching control signal to control the master switching circuit based on the first set signal and a first ON-time period control signal; a second switching control circuit, configured to provide a second switching control signal to control the slave switching circuit based on the second set signal and a second ON-time period control signal; and an interleaving control circuit, configured to judge a phase zone of the slave switching circuit based on the first switching control signal and the second set signal, wherein the interleaving control circuit is configured to provide a set-delay signal to postpone a turn-ON moment of the slave switching circuit when the slave switching circuit is judged as in a leading phase zone, and wherein the interleaving control circuit is configured to provide a reference calibration signal to bring forward the turn-ON moment of the slave switching circuit when the slave switching circuit is judged as in a lagging phase zone.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to multi-rail switching converter, control circuit and associated control method. As used hereinafter, the term "couple" generally refers to multiple ways including a direct connection with an electrical conductor and an indirect connection through intermediates, for example diodes, resistors, capacitors.

Figure 1:
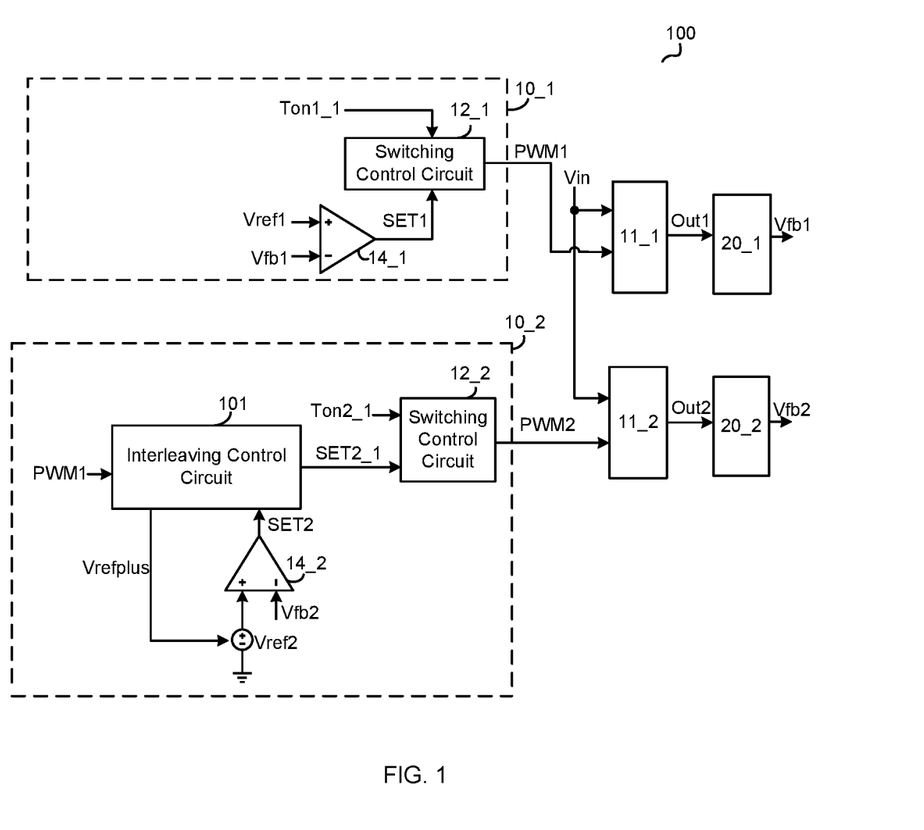
FIG. 1 illustrates a circuit block diagram of a multi-rail switching converter 100 according to an embodiment of the present invention.

FIG. 1 illustrates a circuit block diagram of a multi-rail switching converter 100 according to an embodiment of the present invention. Multi-rail switching converter 100 has an input port configured to receive an input voltage Vin, a first output port configured to provide an output signal Out1, and a second output port configured to provide an output signal Out2.

Multi-rail switching converter 100 comprises a switching circuit 11_1 and a switching circuit 11_2. Switching circuit 11_1 comprises at least one switch controlled by a switching control signal PWM1, and switching circuit 11_2 comprises at least one switch controlled by a switching control signal PWM2. Switching circuit 11_1 is configured to receive input voltage Vin, and provide output signal Out1 by turning ON and turning OFF the at least one switch in switching circuit 11_1. Switching circuit 11_2 is configured to receive input voltage Vin, and provide output signal Out2 by turning ON and turning OFF the at least one switch in switching circuit 11_2. Multi-rail switching converter 100 further comprises a control circuit comprising a sub-control circuit 10_1 for controlling switching circuit 11_1 and a sub-control circuit 10_2 for controlling switching circuit 11_2.

Sub-control circuit 10_1 comprises a comparison circuit 14_1 and a switching control circuit 12_1. Comparison circuit 14_1 is configured to provide a set signal SET1 based on output signal Out1 and a reference signal Vref1 to control a turn-ON moment of switching circuit 11_1, that is to turn ON the at least one switch of switching circuit 11_1. Output signal Out1 may be, for example, output voltage, output current, or output power. In one embodiment, multi-rail switching converter 100 comprises a feedback circuit 20_1 configured to provide a feedback signal Vfb1 representative of output signal Out1. Comparison circuit 14_1 is configured to provide set signal SET1 via comparing feedback signal Vfb1 with reference signal Vref1. Switching control circuit 12_1 is configured to provide switching control signal PWM1 based on set signal SET1 and an ON-time period control signal Ton1_1, wherein switching control signal PWM1 is configured to turn ON the at least one switch of switching circuit 11_1 based on set signal SET1 and turn OFF the at least one switch of switching circuit 11_1 based on ON-time period control signal Ton1_1. In one embodiment, set signal SET1 is configured to turn ON switching circuit 11_1 when feedback signal Vfb1 is less than reference signal Vref1. In one embodiment, sub-control circuit 10_1 is configured to provide ON-time period control signal Ton1_1 based on input voltage Vin, and/or output signal Out1 to control the ON-time period of switching circuit 11_1, i.e., to turn OFF switching circuit 11_1, and as a result, to regulate a switching frequency of switching circuit 11_1.

Sub-control circuit 10_2 comprises a comparison circuit 14_2, a switching control circuit 12_2, and an interleaving control circuit 101. Similarly to comparison circuit 14_1, comparison circuit 14_2 provides set signal SET2 based on output signal Out2 and a reference signal Vref2 to control a turn-ON moment of the least one switch of switching circuit 11_2. In one embodiment, multi-rail switching converter 100 comprises a feedback circuit 20_2, providing a feedback signal Vfb2 representative of output signal Out2. Interleaving control circuit 101 judges a phase zone of switching circuit 11_2 based on switching control signal PWM1 and set signal SET2. When switching circuit 11_2 is judged as in a leading phase zone, interleaving control circuit 101 provides a delayed set signal SET2_1 by postponing set signal SET2 a set-delay time period to adjust the turn-ON moment of switching circuit 11_2. When switching circuit 11_2 is judged as in a lagging phase zone, interleaving control circuit 101 provides a reference calibration signal Vrefplus to calibrate reference signal Vref2. Comparison circuit 14_2 provides set signal SET2 via comparing feedback signal Vfb2 with a calibrated reference signal. Switching control circuit 12_2 provides switching control signal PWM2 based on set signal SET2 and an ON-time period control signal Ton2_1 to turn ON and turn OFF the at least one switch of switching circuit 11_2. In one embodiment, sub-control circuit 10_2 is configured to provide ON-time period control signal Ton2_1 based on input voltage Vin, and/or output signal Out2 to control the ON-time period of switching circuit 11_2, i.e., to turn OFF switching circuit 11_2, and as a result, to regulate a switching frequency of switching circuit 11_2.

Multi-rail switching converter 100 shown in FIG. 1 has dual-rail switching circuits as one example. However, one with ordinary skill in the art should know that multi-rail switching converter 100 could extend to have N-rail switching circuits to provide N output signals, where N is an integer larger than or equal 2. For example, a sub-control circuit judges a phase zone of a Kth switching circuit based on switching control signal PWM1 and a set signal of the Kth switching circuit, where K in an integer larger than 1 and less than or equal N. When the Kth switching circuit is judged as in the leading phase zone, postponing the set signal of the Kth switching circuit to postpone a turn-ON moment of the Kth switching circuit. When the Kth switching circuit is judged as in the lagging phase zone, calibrating a reference signal for the Kth switching circuit by providing reference calibration signal Vrefplus to bring forward the turn-ON moment of the Kth switching circuit.

Figure 2:
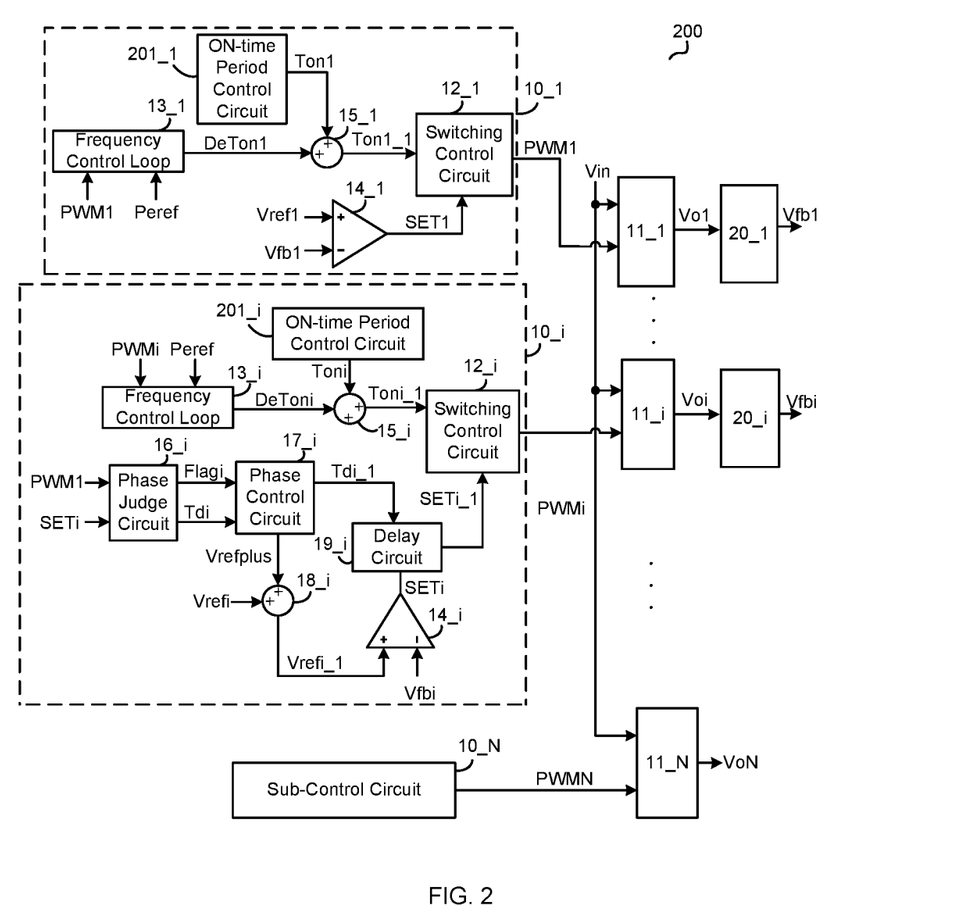
FIG. 2 schematically illustrates a multi-rail switching converter 200 according to an embodiment of the present invention.

FIG. 2 schematically illustrates a multi-rail switching converter 200 according to an embodiment of the present invention. Multi-rail switching converter 200 comprises N output ports to provide output voltages Vo1-VoN. As shown in FIG. 2, Multi-rail switching converter 200 comprises a plurality of switching circuits 11_1-11_N, and each switching circuit 11_i comprises at least one switch controlled by a switching control signal PWMi, where i is an integer larger than or equal 1, and less than or equal N. Each switching control circuit 11_i receives input voltage Vin, and provides an output voltage Voi. In one embodiment, switching circuit 11_1 is configured as a master switching circuit, and switching circuits 11_2-11_N are configured as slave switching circuits.

Multi-rail switching converter 200 comprises a control circuit comprising a plurality of sub-control circuits 10_1-10_N. Sub-control circuit 10_1 comprises an ON-time period control circuit 201_1, a frequency control loop 13_1, an operation circuit 15_1, comparison circuit 14_1, and switching control circuit 12_1. ON-time period control circuit 201_1 provides an ON-time period control signal Ton1 to control an ON-time period of switching circuit 11_1. Frequency control loop 13_1 receives switching control signal PWM1 and a period reference signal Peref, and provides an ON-time period calibration signal DeTon1 to adjust the ON-time period of switching circuit 11_1 via comparing a switching period of switching circuit 11_1 with a predetermined time period represented by period reference signal Peref. As a result, the switching period of switching circuit 11_1 equals the predetermined time period. Operation circuit 15_1 receives ON-time period control signal Ton1 and ON-time period calibration signal DeTon1, and provides ON-time period control signal Ton1_1 based on sum of ON-time control signal Ton1 and ON-time period calibration signal DeTon1 to control the ON-time period of switching circuit 11_1. Comparison circuit 14_1 provides set signal SET1 based on reference signal Vref1 and output voltage Vo1 to turn ON switching circuit 11_1. In one embodiment, comparison circuit 14_1 comprises a comparator, having an inverting input terminal configured to receive feedback signal Vfb1 representative of output voltage Vo1, a non-inverting input terminal configured to receive reference signal Vref1, and an output terminal configured to provide set signal SET1. Switching control circuit 12_1 is coupled to operation circuit 15_1 to receive ON-time period control signal Ton1_1, coupled to comparison circuit 14_1 to receive set signal SET1, and provides switching control signal PWM1 to control switching circuit 11_1 based on ON-time period control signal Ton1_1 and set signal SET1.

Similarly to sub-control circuit 10_1, sub-control circuit 10_i for one of switching circuits 11_2-11_N comprises an ON-time period control circuit 201_i, a frequency control loop 13_i, an operation circuit 15_i, a comparison circuit 14_i, and a switching control circuit 12_i. Sub-control circuit 10_i further comprises an interleaving control circuit comprising a phase judge circuit 16_i, a phase control circuit 17_i, an operation circuit 18_i, and a delay circuit 19_i.

Frequency control loop 13_i receives a switching control signal PWMi and period reference signal Peref, and provides an ON-time period calibration signal DeToni based on switching control signal PWMi and period reference signal Peref to calibrate an ON-time period of switching circuit 11_i, for example, via comparing a switching period of switching circuit 11_i with the predetermined time period represented by period reference signal Peref. As a result, the switching period of switching circuit 11_i equals the predetermined time period. Operation circuit 15_i provides ON-time period control signal Toni_1 based on sum of ON-time period calibration signal DeToni and ON-time period control signal Toni to control the ON-time period of switching circuit 11_i.

Phase judge circuit 16_i receives switching control signal PWM1 and a set signal SETi, judges a phase zone of switching circuit 11_i, and provides a phase judge signal Flagi and a delay signal Tdi. When switching circuit 11_i is judged as in the leading phase zone, phase judge signal Flagi transits to a first state, for example, high voltage level "1"; and when switching circuit 11_i is judged as in the lagging phase zone, phase judge signal Flagi transits to a second state, for example, low voltage level "0". Phase control circuit 17_i provides reference calibration signal Vrefplus based on phase judge signal Flagi, and provides a set-delay signal Tdi_1 based on phase judge signal Flagi and delay signal Tdi. When phase judge signal Flagi is the first state, sub-control circuit 10_i postpones a turn-ON moment of switching circuit 11_i based on set-delay signal Tdi_1, for example, providing a delayed set signal SETi_1 by postponing set signal SETi a set-delay time period which is determined by set-delay signal Tdi_1. When phase judge signal Flagi is the second state, sub-control circuit 10_i provides a calibrated reference signal Vrefi_1 based on sum of reference calibration signal Vrefplus and reference signal Vrefi. An objective of the interleaving control circuit is to achieve average distribution of phase-shift among switching circuits 11_1-11_N, i.e., to control a phase-shift between two consecutive switching circuits being 360/N degree. Taking a dual-rail switching converter for example, a phase-shift between two switching circuits equals 360/2, i.e., 180 degree. Taking a three-rail switching converter for example, a phase-shift between a first switching circuit and a second switching circuit equals 360/3, i.e., 120 degree, and a phase-shift between the second switching circuit and a third switching circuit equals 120 degree.

Operation circuit 18_i provides sum of reference calibration signal Vrefplus and reference signal Vrefi as calibrated reference signal Vrefi_1 to comparison circuit 14_i. Comparison circuit 14_i provides set signal SETi to control the turn-ON moment of switching circuit 11_i based on reference signal Vrefi and output voltage Voi. In one embodiment, comparison circuit 14_i comprises a comparator, having a non-inverting terminal configured to receive calibrated reference signal Vrefi_1, an inverting terminal configured to receive feedback signal Vfbi representative of output voltage Voi, and an output terminal configured to provide set signal SETi. Delay circuit 19_i receives set-delay signal Tdi_1 and set signal SETi, and provides delayed set signal SETi_1 by postponing set signal SETi the set-delay time period determined by set-delay signal Tdi_1. Switching control circuit 12_i provides switching control signal PWMi to control switching circuit 11_i based on ON-time period control signal Toni_1 and delayed set signal SETi_1.

Because of frequency control loops 13_1-13_N, each switching period of switching circuits 11_1-11_N equals the predetermined time period represented by period reference signal Peref, and switching frequency of switching circuits 11_1-11_N equals each other, which insures implement of interleaving control.

Figure 3:
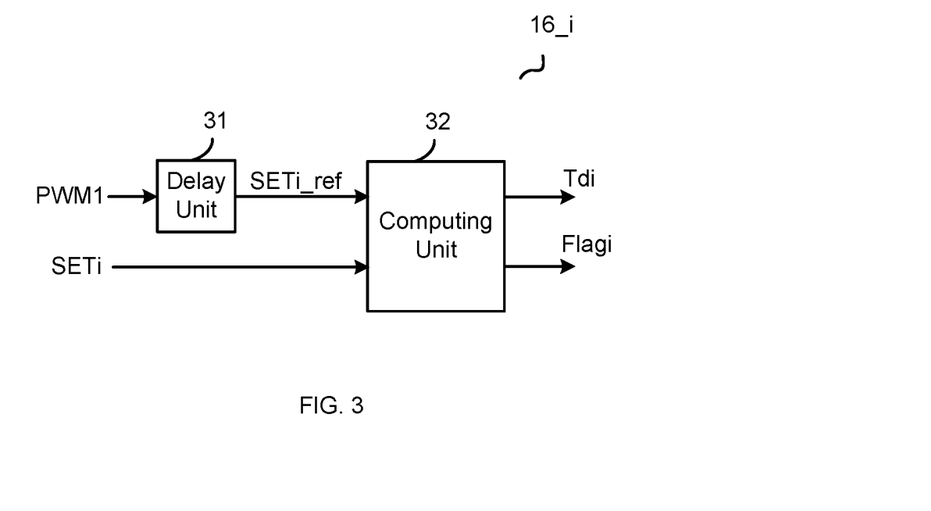
FIG. 3 schematically illustrates a phase judge circuit 16_i of multi-rail switching converter 200 as shown in FIG. 2 according to an embodiment of the present invention.

FIG. 3 schematically illustrates phase judge circuit 16_i of multi-rail switching converter 200 as shown in FIG. 2 according to an embodiment of the present invention. Phase judge circuit 16_i comprises a delay unit 31 and a computing unit 32. Delay unit 31 receives switching control signal PWM1, and provides set reference signal SETi_ref. in one embodiment, delay unit 31 provides set reference signal SETi_ref by postponing a status of switching control signal PWM1 a set reference delay time period Ti, the status of switching control signal PWM1 for example may be a rising edge, a falling edge or a mid-point of high voltage level. Computing unit 32 judges the phase zone of switching circuit 11_i and provides phase judge signal Flagi and delay signal Tdi based on set signal SETi and set reference signal SETi_ref. A detailed operation of phase judge circuit 16_i will be described below.

Figure 4:
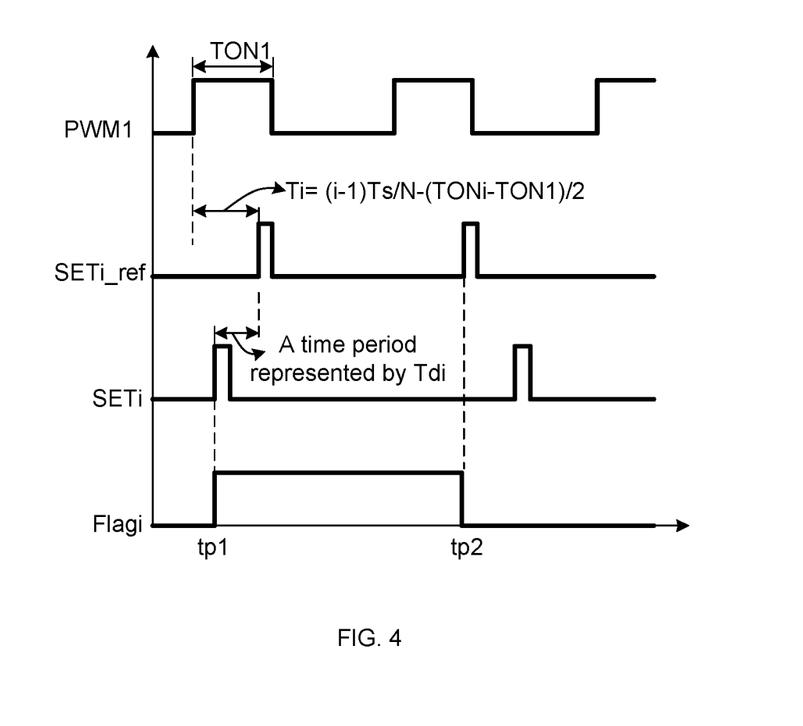
FIG. 4 shows waveforms of phase judge circuit 16_i as shown in FIG. 3 according to an embodiment of the present invention.

FIG. 4 illustrates waveforms of phase judge circuit 16_i as shown in FIG. 3. Waveforms shown in FIG. 4 are switching control signal PWM1, set reference signal SETi_ref, set signal SETi and phase judge signal Flagi from top to below. In the embodiment shown in FIG. 4, when switching control signal PWM1 becomes high voltage level, set reference signal SETi_ref becomes high voltage level after a set reference delay time period Ti to indicate an anticipative turn-ON moment of switching circuit 11_i. In one embodiment, set reference delay time period Ti decreases when the ON-time period TONi of switching circuit 11_i increases, and set reference delay time period Ti increases when the ON-time period TON1 of switching circuit 11_1 increases. In one embodiment, set reference delay time period Ti is:

$$Ti = (i-1) Ts/N - (TONi - TON1)/2 \quad (1)$$

Where Ts is the switching period of switching circuit 11_1.

One of ordinary skill in the art should also understand that delay unit 31 may provide set reference signal SETi_ref based on other status of switching control signal PWM1. For example, take the midpoint of high voltage level switching control signal PWM1 as a reference point, set reference signal SETi_ref will be high voltage level after a set reference delay time period Ti_2, where reference delay time period Ti_2 is:

$$Ti\_2 = (i-1) Ts/N - (TONi)/2 \quad (2)$$

Continuing with FIG. 4, at time tp1, feedback signal Vfbi is less than calibrated reference signal Vrefi_1, and set signal SETi becomes high voltage level. As shown in FIG. 4, set signal SETi becomes high voltage level earlier than set reference signal SETi_ref, then switching circuit 11_i is judged as in the leading phase zone, and phase judge signal Flagi becomes high voltage level, i.e., the first state. At time tp2, set reference signal SETi_ref becomes high voltage level, which is earlier than set signal SETi, as a result, switching circuit 11_i is judged as in the lagging phase zone, and phase judge signal Flagi becomes low voltage level, i.e., the second state. In one embodiment, when switching circuit 11_i is judged as in the leading phase zone, computing unit 32 provides delay signal Tdi based on a time period from a varying moment of set signal SETi to a varying moment of set reference signal SETi_ref, for example, delay signal Tdi represents a time period from rising edge of set signal SETi to rising edge of set reference signal SETi_ref. In one embodiment, when switching circuit 11_i is judged as in the lagging phase zone, the time period represented by delay signal Tdi is zero.

Figure 5:
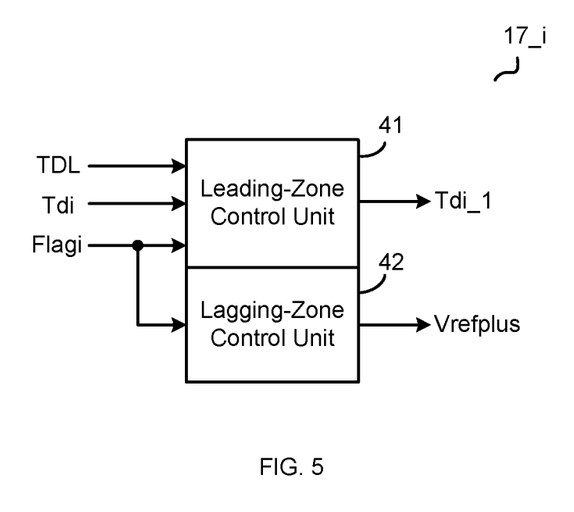
FIG. 5 schematically illustrates a phase control circuit 17_i of multi-rail switching converter 200 as shown in FIG. 2 according to an embodiment of the present invention.

FIG. 5 schematically illustrates phase control circuit 17_i of multi-rail switching converter 200 as shown in FIG. 2 according to an embodiment of the present invention. Phase control circuit 17_i comprises a leading-zone control unit 41 and a lagging-zone control unit 42. Leading-zone control unit 41 receives phase judge signal Flagi and delay signal Tdi, and provides set-delay signal Tdi_1. When phase judge signal Flagi indicates that switching circuit 11_i is at the leading phase zone, leading-zone control unit 41 provides set-delay signal Tdi_1 based on delay signal Tdi. When phase judge signal Flagi indicates that switching circuit 11_i is at the lagging phase zone, set-delay signal Tdi_1 is zero. In one embodiment, leading-zone control unit 41 further receives a constant delay time signal TDL, and when the delay time period represented by delay signal Tdi is longer than a delay time period represented by constant delay time signal TDL, set-delay signal Tdi_1 equals constant delay time signal TDL. The delay time period represented by constant delay time signal is 40ns for one example. When the delay time period represented by delay signal Tdi is shorter than the delay time period represented by constant delay time signal TDL, set-delay signal Tdi_1 equals delay signal Tdi. Lagging-zone control unit 42 receives phase judge signal Flagi, and provides reference calibration signal Vrefplus based on phase judge signal Flagi. When phase judge signal Flagi indicates that switching circuit 11_i is at the lagging phase zone, reference calibration signal Vrefplus equals a predetermined value, for example 5 mV. When phase judge signal Flagi indicates that switching circuit 11_i is at the leading phase zone, reference calibration signal Vrefplus equals zero. A detailed operation of phase control circuit 17_i will be described below.

Figure 6:
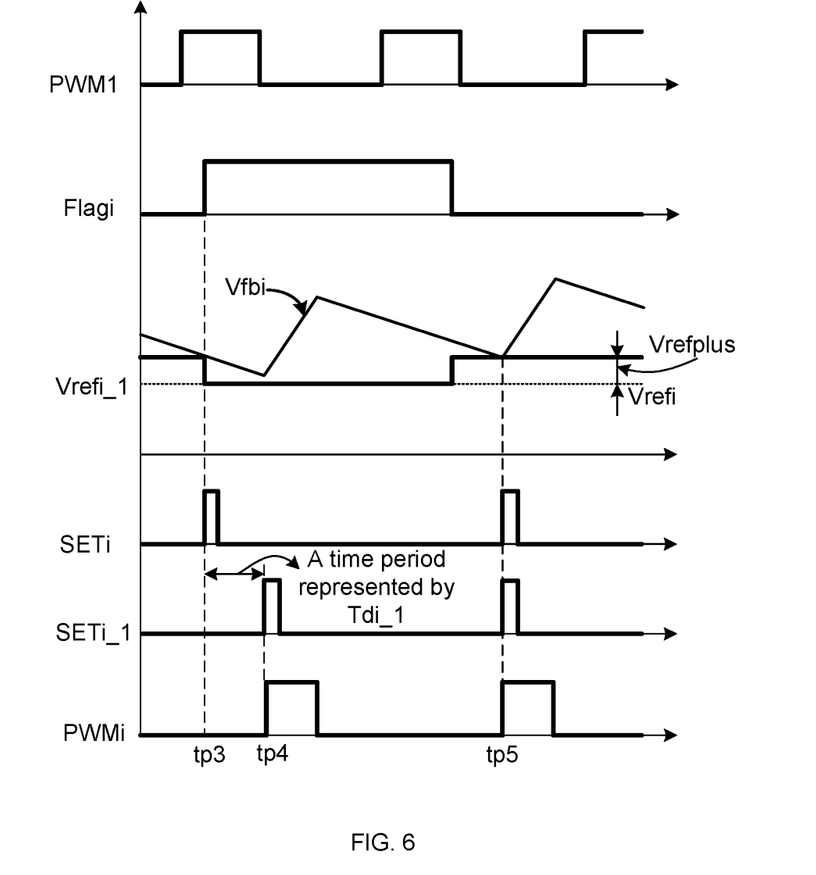
FIG. 6 shows waveforms of phase control circuit 17_i as shown in FIG. 5 according to an embodiment of the present invention.

FIG. 6 illustrates waveforms of phase control circuit 17_i as shown in FIG. 5. Waveforms shown in FIG. 6 are switching control signal PWM1, phase judge signal Flagi, calibrated reference signal Vrefi_1, set signal SETi, delayed set signal SETi_1, and switching control signal PWMi from top to below. As shown in FIG. 6, when feedback signal Vfbi is less than calibrated reference signal Vrefi_1, delayed set signal SETi becomes high voltage level. And at time tp3, phase judge signal Flagi is high voltage level to indicate that switching circuit 11_i is at the lagging phase zone, then delayed set signal SETi_1 is provided by postponing set signal SETi the set-delay time period represented by set-delay signal Tdi_1, and at time tp4, delayed set signal SETi_1 becomes high voltage level, then switching control signal PWMi becomes high voltage level to turn ON switching circuit 11_i. As shown in FIG. 6, when phase judge signal Flagi is high voltage level, calibrated reference signal Vrefi_1 equals reference signal Vrefi, and when phase judge signal Flagi is low voltage level, calibrated reference signal Vrefi_1 equals sum of reference signal Vrefi and reference calibration signal Vrefplus (Vrefi+Vrefplus). At time tp5, feedback signal Vfbi is less than calibrated reference signal Vrefi_1, and flag signal Flagi is low voltage level, then the set delay time period is zero, delayed set signal SETi_1 becomes high voltage level, and switching control signal PWMi becomes high voltage level to turn ON switching circuit 11_i.

Figure 7:
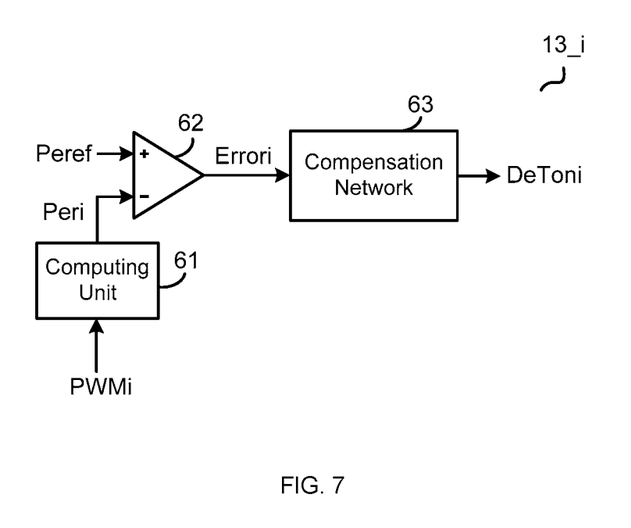
FIG. 7 schematically illustrates a frequency control loop 13_i of switching converter 200 as shown in FIG. 2 according to an embodiment of the present invention.

FIG. 7 schematically illustrates frequency control loop 13_i of switching converter 200 for switching circuits 11_1-11_N as shown in FIG. 2 according to an embodiment of the present invention. Frequency control loop 13_i comprises a computing unit 61, an amplifier 62, and a compensation network 63. Computing unit 61 receives switching control signal PWMi, and provides a period signal Peri representative of the switching period of switching circuit 11_i. In one embodiment, computing unit 61 may comprise a timing circuit, configured to provide period signal Peri via timing two adjacent rising edges of switching control signal PWMi. Amplifier 62 receives period signal Peri and period reference signal Peref, and provides an error signal Errori based on a difference between period signal Peri and period reference signal Peref. Compensation network 63 provides ON-time calibration signal DeToni based on error signal Errori. Compensation network 63 for example may be a proportional-integral (PI) network, a proportional-integral-differential (PID) network, or a non-linear network.

Figure 8:
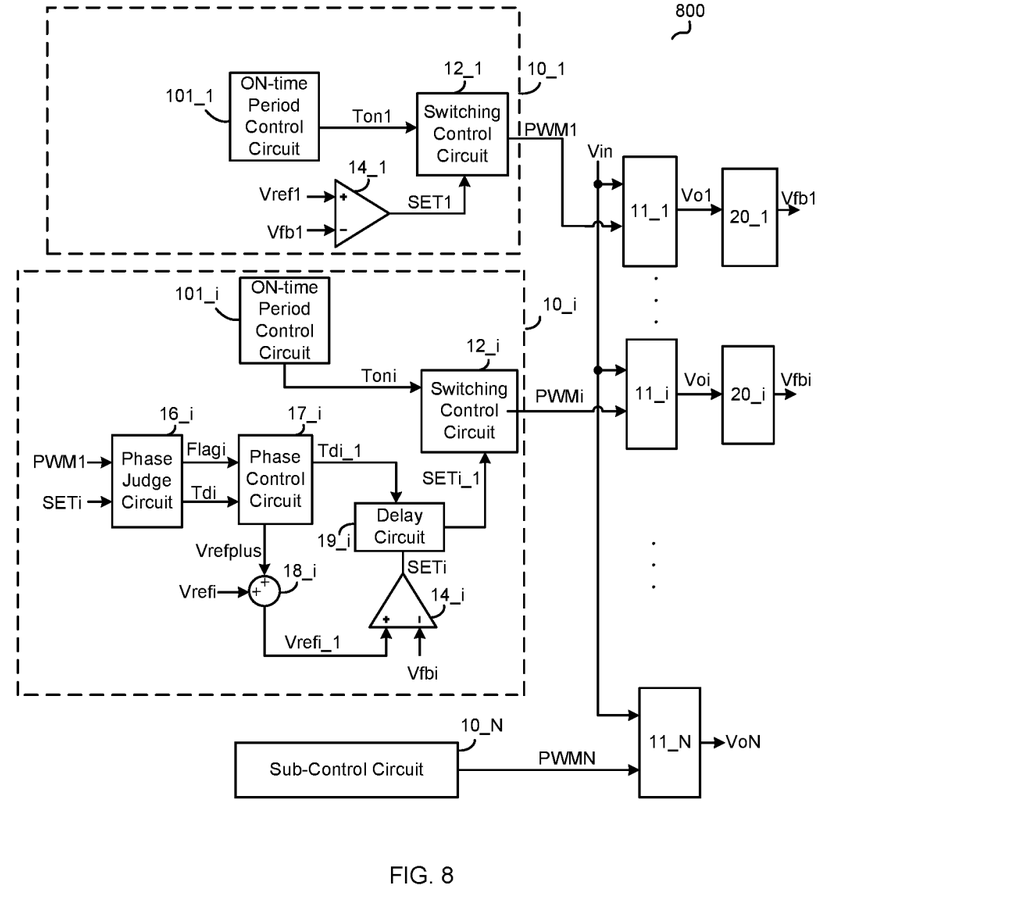
FIG. 8 schematically illustrates a multi-rail switching converter 800 according to an embodiment of the present invention.

FIG. 8 schematically illustrates a multi-rail switching converter 800 according to an embodiment of the present invention. Difference between multi-rail switching converter 800 shown in FIG. 8 and multi-rail switching converter 200 shown in FIG. 2 is that multi-rail switching converter 800 does not comprises frequency control loop 13_1-13_N, and switching control circuits 10_1-10_N receive ON-time period control signals Ton1-TonN to control corresponding ON-time period of switching circuits 11_1-11_N.

Figure 9:
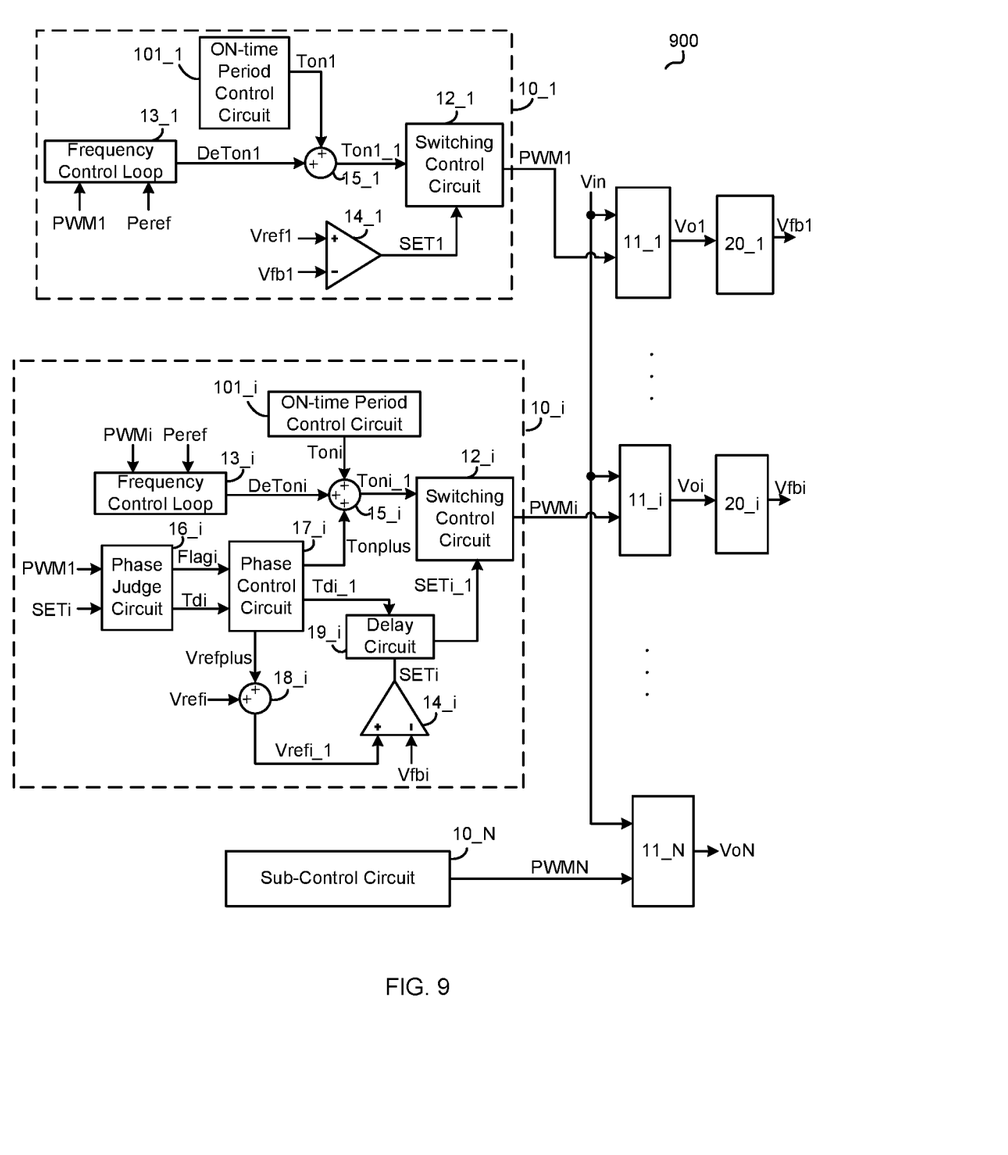
FIG. 9 schematically illustrates a multi-rail switching converter 900 according to an embodiment of the present invention.

FIG. 9 schematically illustrates a multi-rail switching converter 900 according to an embodiment of the present invention. Differences between multi-rail switching converter 900 shown in FIG. 9 and multi-rail switching converter 200 shown in FIG. 2 are described below. In the embodiment shown in FIG. 9, phase control circuit 17_i of multi-rail switching converter 900 further provides an ON-time period calibration signal Tonplus, and switching control circuit 12_i is configured to calibrate the ON-time period of switching circuit 11_i based on sum of ON-time period control signal Toni, ON-time period calibration signal DeToni and ON-time period calibration signal Tonplus. In one embodiment, when switching circuit 11_i is judged as in the leading phase zone, phase control circuit 17_i provides set-delay signal Tdi_1 based on delay signal Tdi, and provides ON-time period calibration signal Tonplus based on a predetermined calibration value, for example 5 ns, to further improve circuit stability. Take step down topology for switching circuit 11_i as one example, when switching circuit 11_i is at the leading phase zone, the turn-ON moment of switching circuit 11_i is postponed after set signal SETi becomes high voltage level, then an average of a current flowing through an inductor in switching circuit 11_i decreases, which leads to decreasing of output voltage Voi, and a position of set signal SETi becoming high voltage level for next switching period varies accordingly, which may cause instability of the output voltage Voi. Multi-rail switching converter 800 provides ON-time period calibration signal Tonplus to finely adjust the ON-time period of switching circuit 11_i to improve circuit stability.

Figure 10:
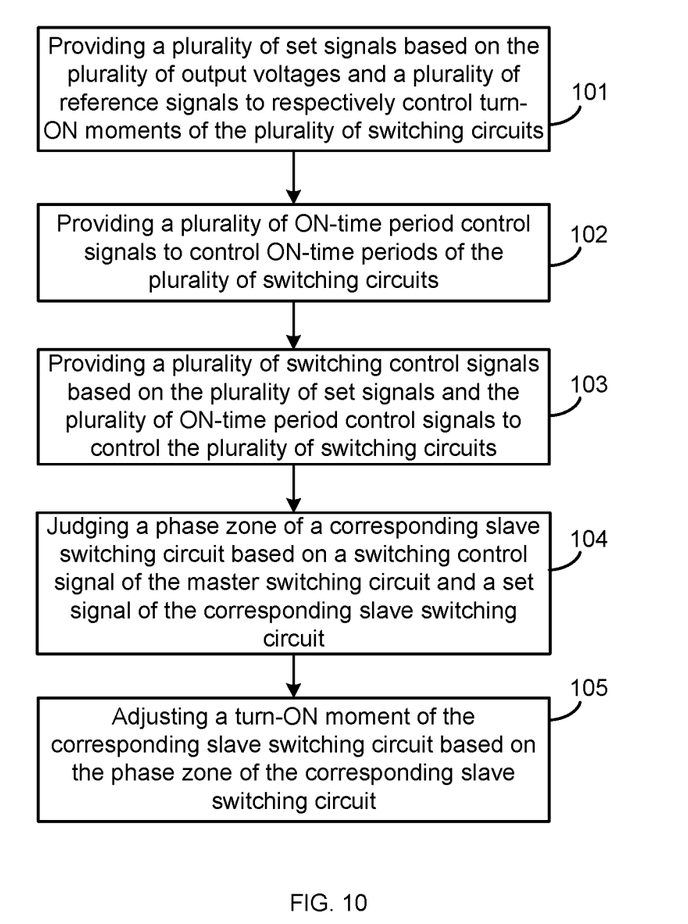
FIG. 10 shows a flow chart illustrating a control method for a multi-rail switching converter according to an embodiment of the present invention.

FIG. 10 shows a flow chart illustrating a control method for a multi-rail switching converter according to an embodiment of the present invention. The multi-rail switching converter comprises a plurality of switching circuits, and a plurality of output ports configured to provide a plurality of output voltages, wherein one of the switching circuits is configured as a master switching circuit, and other of the switching circuits are configured as slave switching circuits. The control method comprises steps 101-105.

At step 101, providing a plurality of set signals based on the plurality of output signals and a plurality of reference signals, each set signal is configured to control a turn-ON moment of a corresponding switching circuit.

At step 102, providing a plurality of ON-time period control signals to control ON-time periods of the plurality of switching circuits.

In one embodiment, step 102 may further comprise adjusting an ON-time period of a corresponding switching circuit via comparing a switching period of the corresponding switching circuit with a predetermined time period. As a result, the switching period of the corresponding switching circuit equals the predetermined time period.

At step 103, providing a plurality of switching control signals based on the plurality of set signals and the plurality of ON-time period control signals to control the plurality of switching circuits.

At step 104, judging a phase zone of a corresponding slave switching circuit based on a switching control signal of the master switching circuit and a set signal of the corresponding slave switching circuit.

In one embodiment, judging the phase zone of the corresponding slave switching circuit comprises: providing a set reference signal based on postponing a status of the switching control signal of the master switching circuit a set reference delay time period, and judging the phase zone of the corresponding slave switching circuit based on the set signal of the corresponding slave switching circuit and the set reference signal, wherein when the set signal of the corresponding slave switching circuit varies before the set reference signal, the corresponding slave switching circuit is judged as in a leading phase zone, and when the set reference signal varies before the set signal of the corresponding slave switching circuit, the corresponding slave switching circuit is judged as in a lagging phase zone.

At step 105, adjusting a turn-ON moment of the corresponding slave switching circuit based on the phase zone of the corresponding slave switching circuit.

In one embodiment, when the corresponding slave switching circuit is at the leading phase zone, postponing the set signal of the corresponding slave switching circuit a set-delay time period to postpone the turn-ON moment of the corresponding slave switching circuit, and when the corresponding slave switching circuit is at the lagging phase zone, providing a reference calibration signal to bring forward the turn-ON moment of the corresponding slave switching circuit.

In one embodiment, when the corresponding slave switching circuit is at the leading phase zone, providing the set-delay time period based on a time period from a varying moment of the set signal of the corresponding slave switching circuit to a varying moment of the set reference signal.

In one embodiment, the control method further comprises when the corresponding slave switching circuit is at the leading phase zone, increasing the ON-time period of the corresponding slave switching circuit a predetermined calibration value, for example, 5 ns.

Note that in the flow chart described above, the box functions may also be implemented with different order as shown in FIG. 10. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A multi-rail switching converter, having an input port and a plurality of output ports configured to provide a plurality of output voltages, the multi-rail switching converter comprising:
   a plurality of switching circuits, each of the plurality of switching circuits having an input terminal coupled to the input port, and an output terminal coupled to one of the plurality of output ports, wherein one of the plurality of switching circuits is configured as a master switching circuit, and the rest of the plurality of switching circuits are configured as slave switching circuits;
   a plurality of comparison circuits, configured to provide a plurality of set signals based on the plurality of output voltages and a plurality of reference signals;
   a plurality of switching control circuits, configured to provide a plurality of switching control signals based on the plurality of set signals and a plurality of ON-time period control signals to control the plurality of switching circuits; and
   an interleaving control circuit, configured to judge a phase zone of a corresponding slave switching circuit based on a switching control signal of the master switching circuit and a set signal of the corresponding slave switching circuit, and configured to adjust a turn-ON moment of the corresponding slave switching circuit based on the phase zone of the corresponding slave switching circuit; wherein
   when the corresponding slave switching circuit is judged as in a leading phase zone, the turn-ON moment of the corresponding slave switching circuit is postponed by postponing the set signal of the corresponding slave switching circuit a set-delay time period; and wherein
   when the corresponding slave switching circuit is judged as in a lagging phase zone, the turn-ON moment of the corresponding slave switching circuit is brought forward by calibrating a reference signal of the corresponding slave switching circuit.

2. The multi-rail switching converter of claim 1, wherein the interleaving control circuit further comprises:
   a phase judge circuit, configured to judge the phase zone of the corresponding slave switching circuit, and configured to provide a phase judge signal and a delay signal; and
   a phase control circuit, configured to provide a set-delay signal based on the delay signal to postpone the turn-ON moment of the corresponding slave switching circuit when the phase judge signal is a first state, and configured to provide a reference calibration signal to bring forward the turn-ON moment of the corresponding slave switching circuit when the phase judge signal is a second state.

3. The multi-rail switching converter of claim 2, wherein the interleaving control circuit further comprises:
   a delay circuit, having a first input terminal, a second input terminal and an output terminal, wherein the first input terminal is coupled to the phase control circuit to receive the set-delay signal, the second input terminal is coupled to a corresponding comparison circuit to receive the set signal of the corresponding slave switching circuit, and the output terminal is configured to provide a delayed set signal by postponing the set signal of the corresponding slave switching circuit the set-delay time period represented by the set-delay signal; and
   an operation circuit, having a first input terminal, a second input terminal and an output terminal, wherein the first input terminal is coupled to the phase control circuit to receive the reference calibration signal, the second input terminal is configured to receive the reference signal of the corresponding slave switching circuit, and the output terminal is configured to provide a calibrated reference signal by adding the reference calibration signal to the reference signal of the corresponding slave switching circuit; wherein
   the corresponding comparison circuit is configured to provide the set signal of the corresponding slave switching circuit by comparing a feedback signal representative of a corresponding output voltage with the calibrated reference signal; and wherein
   one of the plurality of switching control circuits is configured to turn ON the corresponding slave switching circuit based on the delayed set signal.

4. The multi-rail switching converter of claim 1, wherein the interleaving control circuit further comprises:
   a delay unit, having an input terminal and an output terminal, wherein the input terminal is configured to receive the switching control signal of the master switching circuit, the output terminal is configured to provide a set reference signal by postponing a status of the switching control signal of the master switching circuit a set reference delay time period; and
   a first computing unit, having a first input terminal, a second input terminal, a first output terminal and a second output terminal, wherein the first input terminal is coupled to the output terminal of the delay unit to receive the set reference signal, the second input terminal is configured to receive the set signal of the corresponding slave switching circuit, the first output terminal is configured to provide a phase judge signal to indicate the phase zone of the corresponding slave switching circuit, and the second output terminal is configured to provide a delay signal.

5. The multi-rail switching converter of claim 4, wherein the set reference delay time period decreases when an ON-time period of the corresponding slave switching circuit increases, and the set reference delay time period increases when an ON-time period of the master switching circuit increases.

6. The multi-rail switching converter of claim 4, wherein:
   when the set signal of the corresponding slave switching circuit varies ahead of the set reference signal, the corresponding slave switching circuit is judged as in the leading phase zone, the phase judge signal becomes the first state, and the delay signal represents a time period from a varying moment of the set signal of the corresponding slave switching circuit to a varying moment of the set reference signal; and wherein when the set reference signal varies ahead of the set signal of the corresponding slave switching circuit, the corresponding slave switching circuit is judged as in the lagging phase zone, and the phase judge signal becomes the second state.

7. The multi-rail switching converter of claim 4, wherein the interleaving control circuit further comprises:
a leading-zone control unit, having a first input terminal, a second input terminal and an output terminal, wherein the first input terminal is coupled to the first output terminal of the first computing unit to receive the phase judge signal, the second input terminal is coupled to the second output terminal of the first computing unit to receive the delay signal, the output terminal is configured to provide a set-delay signal to determined the set-delay time period based on the delay signal when the phase judge signal is the first state, and the set-delay signal is zero when the phase judge signal is the second state; and
a lagging-zone control unit, having an input terminal and an output terminal, wherein the input terminal is coupled to the first output terminal of the first computing unit to receive the phase judge signal, the output terminal is configured to provide a reference calibration signal to calibrate the reference signal of the corresponding slave switching circuit based on a predetermined value when the phase judge signal is the second state, and the reference calibration signal is zero when the phase judge signal is the first state.

8. The multi-rail switching converter of claim 1, wherein the control circuit further comprises a plurality of frequency control loops, configured to provide a plurality of first ON-time period calibration signals based on switching periods of the plurality of switching circuits and a predetermined time period to regulate ON-time periods of the plurality of switching circuits.

9. The multi-rail switching converter of claim 8, wherein the interleaving control circuit is configured to provide a second ON-time period calibration signal when the corresponding slave switching circuit is judged as in the leading phase zone, and an ON-time period of the corresponding slave switching circuit is regulated based on sum of a first ON-time period calibration signal of the corresponding slave switching circuit, the second ON-time period calibration signal and an ON-time period control signal of the corresponding slave switching circuit.

10. The multi-rail switching converter of claim 8, wherein each of the plurality of frequency control loops further comprises:
a second computing unit, having an input terminal and an output terminal, wherein the input terminal is configured to receive a switching control signal of a corresponding switching circuit, and the output terminal is configured to provide a period signal representative of a switching period of the corresponding switching circuit;
an amplifier, having a first input terminal, a second input terminal and an output terminal, wherein the first input terminal is coupled to the output terminal of the second computing unit to receive the period signal, the second input terminal is configured to receive a period reference signal representative of the predetermined time period, and the output terminal is configured to provide an error signal based on a difference between the period signal and the period reference signal; and
a compensation network, having an input terminal and an output terminal, wherein the input terminal is coupled to the output terminal of the amplifier to receive the error signal, and the output terminal is configured to provide a first ON-time period calibration signal, and wherein an ON-time period of the corresponding switching circuit is regulated based on the first ON-time period calibration signal and an ON-time period control signal of the corresponding switching circuit.

11. A control method for a multi-rail switching converter, the multi-rail switching converter having a plurality of switching circuits to provide a plurality of output voltages, and one of the switching circuits is configured as a master switching circuit, and other of the plurality of switching circuits are configured as slave switching circuits, the control method comprising:
providing a plurality of set signals based on the plurality of output voltages and a plurality of reference signals;
providing a plurality of ON-time period control signals to control ON-time periods of the plurality of switching circuits;
providing a plurality of switching control signals based on the plurality of set signals and the plurality of ON-time period control signals to control the plurality of switching circuits; and
judging a phase zone of a corresponding slave switching circuit based on a switching control signal of the master switching circuit and a set signal of the corresponding slave switching circuit; wherein
when the corresponding slave switching circuit is judged as in a leading phase zone, postponing a turn-ON moment of the corresponding slave switching circuit by postponing the set signal of the corresponding slave switching circuit a set-delay time period; and wherein
when the corresponding slave switching circuit is judged as in a lagging phase zone, providing a reference calibration signal to bring forward the turn-ON moment of the corresponding slave switching circuit by calibrating a reference signal of the corresponding slave switching circuit.

12. The control method of claim 11, wherein judging the phase zone of the corresponding slave switching circuit comprises:
providing a set reference signal by postponing a status of the switching control signal of the master switching circuit; and
judging the phase zone of the corresponding slave switching circuit based on the set signal of the corresponding slave switching circuit and the set reference signal; wherein
when the set signal of the corresponding slave switching circuit varies ahead of the set reference signal, the corresponding slave switching circuit is judged as in the leading phase zone; and wherein
when the set reference signal varies ahead of the set signal of the corresponding slave switching circuit, the corresponding slave switching circuit is judged as in the lagging phase zone.

13. The control method of claim 12, further comprises providing the set delay time period based on a time period from a varying moment of the set signal of the corresponding slave switching circuit to a varying moment of the set reference signal when the corresponding slave switching circuit is judged as in the leading phase zone.

14. The control method of claim 11, further comprises increasing an ON-time period of the corresponding slave switching circuit when the corresponding slave switching circuit is judged as in the leading phase zone.

15. The control method of claim 11, further comprises regulating an ON-time period of one of the plurality of switching circuits by comparing a switching period of the one of the plurality of switching circuits with a predetermined time period.

16. A control circuit for a multi-rail switching converter, the multi-rail switching converter having a master switching circuit configured to provide a first output voltage and a slave switching circuit configured to provide a second output voltage, the control circuit comprising:
   a first comparison circuit, configured to provide a first set signal based on the first output voltage and a first reference signal;
   a second comparison circuit, configured to provide a second set signal based on the second output voltage and a second reference signal;
   a first switching control circuit, configured to provide a first switching control signal to control the master switching circuit based on the first set signal and a first ON-time period control signal;
   a second switching control circuit, configured to provide a second switching control signal to control the slave switching circuit based on the second set signal and a second ON-time period control signal; and
   an interleaving control circuit, configured to judge a phase zone of the slave switching circuit based on the first switching control signal and the second set signal, wherein the interleaving control circuit is configured to provide a set-delay signal to postpone a turn-ON moment of the slave switching circuit when the slave switching circuit is judged as in a leading phase zone, and wherein the interleaving control circuit is configured to provide a reference calibration signal to bring forward the turn-ON moment of the slave switching circuit when the slave switching circuit is judged as in a lagging phase zone.

17. The control circuit of claim 16, wherein the interleaving control circuit further comprises:
   a delay circuit, configured to provide a delayed set signal by postponing the second set signal a set-delay time period, wherein the set-delay time period is determined by the set-delay signal; and
   an operation circuit, configured to provide a calibrated reference signal by adding the reference calibration signal to the second reference signal; wherein
   the second comparison circuit is configured to provide the second set signal by comparing a feedback signal representative of the second output voltage with the calibrated reference signal; and wherein
   the second switching circuit is configured to turn ON the slave switching circuit based on the delayed set signal.

18. The control circuit of claim 16, wherein the interleaving control circuit further comprises:
   a delay unit, configured to provide a set reference signal by postponing a status of the first switching control signal; wherein
   when the second set signal varies ahead of the set reference signal, the slave switching circuit is judged as in the leading phase zone; and wherein
   when the set reference signal varies ahead of the second set signal, the slave switching circuit is judge as in the lagging phase zone.

19. The control circuit of claim 16, wherein the interleaving control circuit further comprises:
   a delay unit, configured to provide a set reference signal by postponing a status of the first switching control signal;
   a leading-zone control unit, configured to provide the set-delay signal based on a time period from a varying moment of the second set signal to a varying moment of the set reference signal when the slave switching circuit is judged as in the leading phase zone; and
   a lagging-zone control unit, configured to provide the reference calibration signal based on a predetermined value when the slave switching circuit is judged as in the lagging phase zone.

20. The control circuit of claim 16, wherein the control circuit further comprises:
   a first frequency control loop, configured to provide a first ON-time calibration signal based on a switching period of the master switching circuit and a predetermined time period, wherein an ON-time period of the master switching circuit is regulated based on the first ON-time calibration signal and the first ON-time period control signal; and
   a second frequency control loop, configured to provide a second ON-time calibration signal based on a switching period of the slave switching circuit and the predetermined time period; wherein
   the interleaving control circuit is configured to provide a third ON-time period calibration signal when the slave switching circuit is judged as in the leading phase zone, and an ON-time period of the slave switching circuit is regulated based on the second ON-time period calibration signal, the third ON-time period calibration signal, and the second ON-time period control signal.

* * * * *